(12) United States Patent
Poljansek et al.

(10) Patent No.: US 6,497,161 B2
(45) Date of Patent: Dec. 24, 2002

(54) SYSTEM FOR ADJUSTING A TRANSMISSION RATIO IN A TRANSMISSION BUILT INTO A MOTOR VEHICLE

(75) Inventors: Marko Poljansek, Reutlingen (DE); Rasmus Frei, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/819,981

(22) Filed: Mar. 29, 2001

(65) Prior Publication Data

US 2001/0025538 A1 Oct. 4, 2001

(30) Foreign Application Priority Data

Mar. 29, 2000 (DE) .......................... 100 15 649

(51) Int. Cl.[7] .................. F16H 59/08; F16H 59/02; F16H 59/04; B60K 23/00
(52) U.S. Cl. ................ 74/335; 701/51; 477/34
(58) Field of Search .............. 701/51, 61, 58, 701/52–60, 62–66; 74/335, 336 R; 477/34, 43, 46, 120, 129, 904, 37, 906, 125

(56) References Cited

U.S. PATENT DOCUMENTS

| | | | |
|---|---|---|---|
| 4,899,278 A | * 2/1990 | Yamamoto et al. | ........... 701/62 |
| 5,157,609 A | 10/1992 | Stehle et al. | |
| 5,351,776 A | 10/1994 | Keller et al. | |
| 5,857,161 A | 1/1999 | Zeilinger et al. | |

FOREIGN PATENT DOCUMENTS

| | | | |
|---|---|---|---|
| DE | 4136613 | | 5/1993 |
| EP | 0602685 | * | 6/1994 |

OTHER PUBLICATIONS

"Die Adaptive Getriebesteuerung für die Automatikgetriebe der BMW Fahrzeuge mit Zwölfzylindermotor" by A. Welter et al, ATZ Automobiltechnische Zeitschrift 94 (1992) 9, pp. 428 to 436.

"Die Adaptive Getriebesteuerung für BMW–Automobile" by A. Welter et al, ATZ Automobiltechnische Zeitschrift 95 (1993) 9, pp. 420 to 434.

* cited by examiner

Primary Examiner—Douglas C. Butler
(74) Attorney, Agent, or Firm—Walter Ottesen

(57) ABSTRACT

A system for adjusting a transmission ratio for a transmission built into a motor vehicle. Selection devices actuable by the driver of the vehicle are provided. With these selection devices, the driver can pregive pulses to change the transmission ratio. In a first component object, the pulse processing, pulses are detected whereupon in a second component object, the counter, count values are determined and stored in dependence upon valid pulses. In a third component object, the switch request, shift requests are determined in dependence upon count values and while considering pregivable peripheral conditions. The transmission ratio is adjusted in dependence upon the shift requests. With the defined interfaces of the objects, the exchangeability thereof is made possible whereby especially a reuse of the software is facilitated.

8 Claims, 5 Drawing Sheets

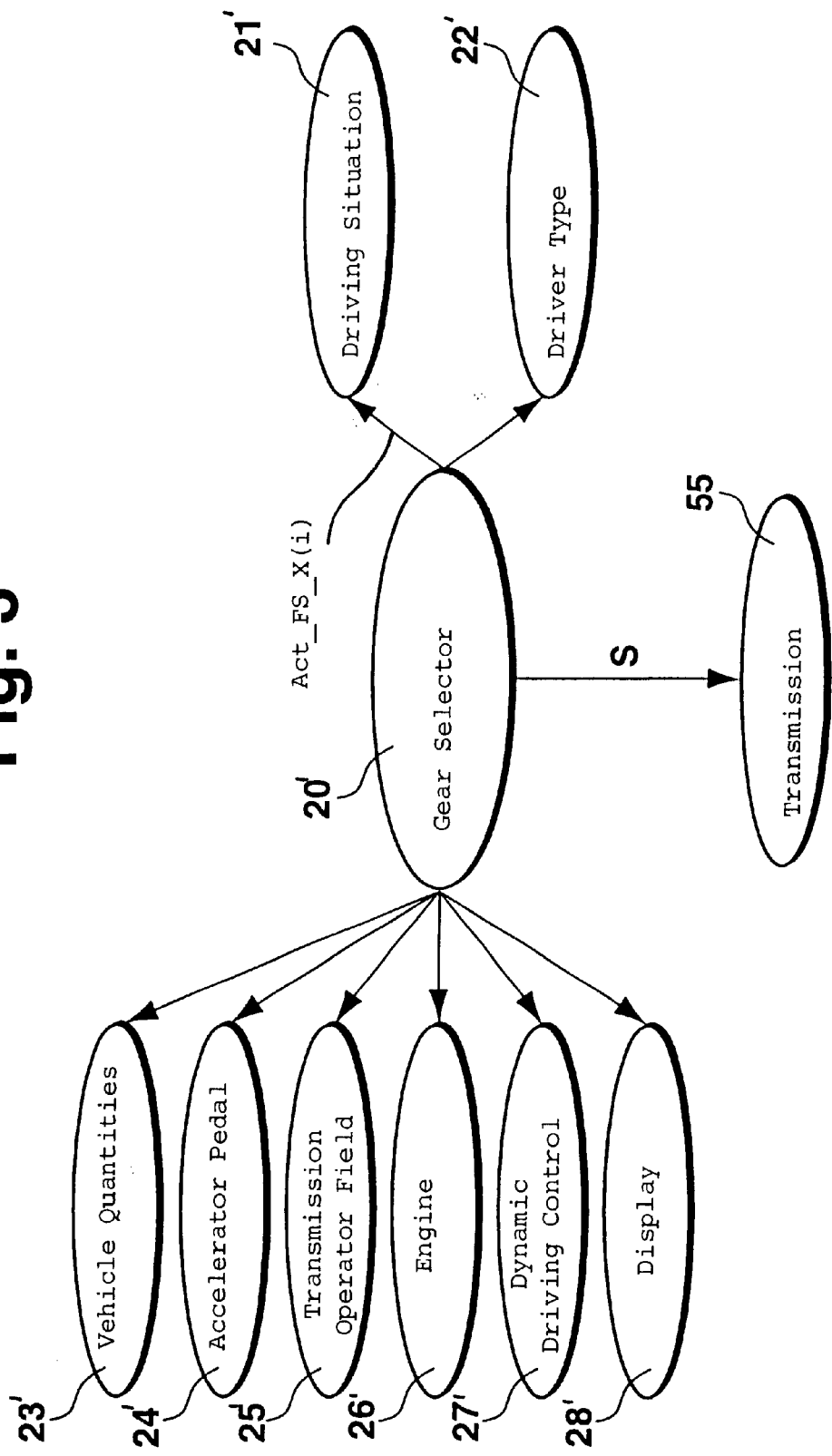

+ Touch Shift + active
− Touch Shift − active
_ Negate

SYSTEM FOR ADJUSTING A TRANSMISSION RATIO IN A TRANSMISSION BUILT INTO A MOTOR VEHICLE

BACKGROUND OF THE INVENTION

Adaptive transmission controls are, for example, known from U.S. Pat. No. 5,157,609 and German patent publication 4,136,613 as well as from the articles from "Automobiltechnische Zeitschrift" 94 (1992) 9, starting at page 428 and from "Automobiltechnische Zeitschrift" 95 (1993) 9, starting at page 420. In automatic transmissions, the transmission changes are, in general, determined in dependence upon the vehicle longitudinal speed and the engine load (throttle flap angle). This takes place by means of a characteristic field. In adaptive transmission control systems, the characteristic field can be adapted to the behavior of the driver (driver type), the traffic situation and/or the driving situation to which the vehicle is subjected. The transmission ratio changes are determined by means of the characteristic field. In setting the behavior of the driver, it is generally evaluated whether the driver adheres more to a driving-power orientated driving manner or more to a fuel optimized driving manner. In the evaluation of the traffic and driving situation, it can be distinguished, for example, whether the vehicle is in city traffic, ahead of or in a curve, on a hill or in overrun operation. Depending upon the evaluation of the above-mentioned points, the particular characteristic line which is suitable is selected from a number of different characteristic lines. Furthermore, a shifting of the base shifting characteristic field, as described in U.S. Pat. No. 5,857,161, can be provided.

Furthermore, it is conventional in vehicles having an automatic transmission (AT) to provide a driver with the possibility to manually shift. This is so because a control via a determination of type of driver and driving situation can be adapted to the driver and to the instantaneous conditions of the roadways, however, a "look-ahead" driving can only be provided by the driver. In many vehicles, a separate shifting path (M-path) is provided for the so-called touch operation. In automated manual transmissions (ASG), this manual mode or touch-shift operation is declared to be the main operating mode in order to make the conversion from manual transmission desirable to the end customer. The characterization "touch-shift operation" is based on the situation that mostly no direct gear command can be pregiven; instead, the driver can sequentially touch-shift up or touch-shift down one gear at a time starting from the gear in place.

With respect to the so-called "touch-shift operation", there is a great variety of different desires of the vehicle manufacturer as to how the transmission control (GS) has to react to the touch-shift commands.

SUMMARY OF THE INVENTION

It is the object of the invention to provide a unified structure for controlling the transmission via touch-shift, commands which can be adapted as easily as possible to the different commands.

The invention proceeds from a system for adjusting a transmission ratio in a transmission built into a motor vehicle. Here, selection means are provided which are actuable by the driver of the vehicle and with which the driver can pregive pulses for changing the transmission ratios. In a first component object, the pulse processing, pulses are detected whereupon, in a second component object, the counter, numerical values are determined and stored in dependence upon valid pulses. In a third component object, the shift request, shift commands are determined in dependence upon numerical values and while considering pregivable peripheral conditions. The transmission ratio is adjusted in dependence upon the shift requests.

According to the invention, the pulse determination and their conversion into specific shift inputs for the transmission are realized fully independently of each other. These component objects communicate only indirectly via the component object "counter" with each other. In each of the three component objects, changes can be made independently of each other in accordance with changes specific to the customer. The pulse determination and the shift request can even be worked off in different time rasters in order to satisfy the particular time-dependent requests made on the signals. With the defined interfaces of the objects, an exchangeability thereof is made possible whereby especially a reusability of the software for different control versions is facilitated.

In an advantageous embodiment of the invention, it is provided that the selection means are so configured that the driver can either input an upshift or a downshift command.

In the first component object, the pulse processing, the pulses are advantageously so detected that a single pulse is detected per actuation of the selection means.

In the second component object, which can be configured as a counter, a count value is incremented or decremented in dependence upon a pulse detected by the first component object.

The third component object, the shift request, advantageously has a first part, the touch-shift shift inhibitor, by means of which a check is made as to whether a transmission gear, which is desired via actuation of the selector means, is permissible or impermissible. Here, it is provided that such transmission shift operations are prevented which would lead to an impermissibly high or an impermissibly low rpm of the vehicle engine.

Furthermore, the third component object, the shift request, can have a second part, the touch-shift lever, by means of which a pregivable time duration can be allowed to elapse in the case of a downshift operation commanded by actuation of the selection means until a downshift operation is initiated. Here, it is especially provided that the count value is read out of the second component object, the counter, during this time duration. If, within this time duration, a downshift operation is again wanted by the driver via the actuation of the selection means, then a double downshift can be initiated insofar as possible.

Furthermore, the third component object, the shift request, can exhibit a third part, the touch-shift characteristic line, by means of which it can be determined whether the instantaneously adjusted transmission gear is within a pregiven range. A shift operation is then triggered when the instantaneously adjusted transmission gear is outside of the range. By means of the touch-shift characteristic line, a downshift operation is triggered in dependence upon the actuation of a kickdown switch.

BRIEF DESCRIPTION OF THE DRAWINGS

The invention will now be described with reference to the drawings wherein:

FIG. 3 likewise shows structures for controlling the functions of the individual elements of the drive train;

DESCRIPTION OF THE PREFERRED EMBODIMENTS OF THE INVENTION

Figure 1:
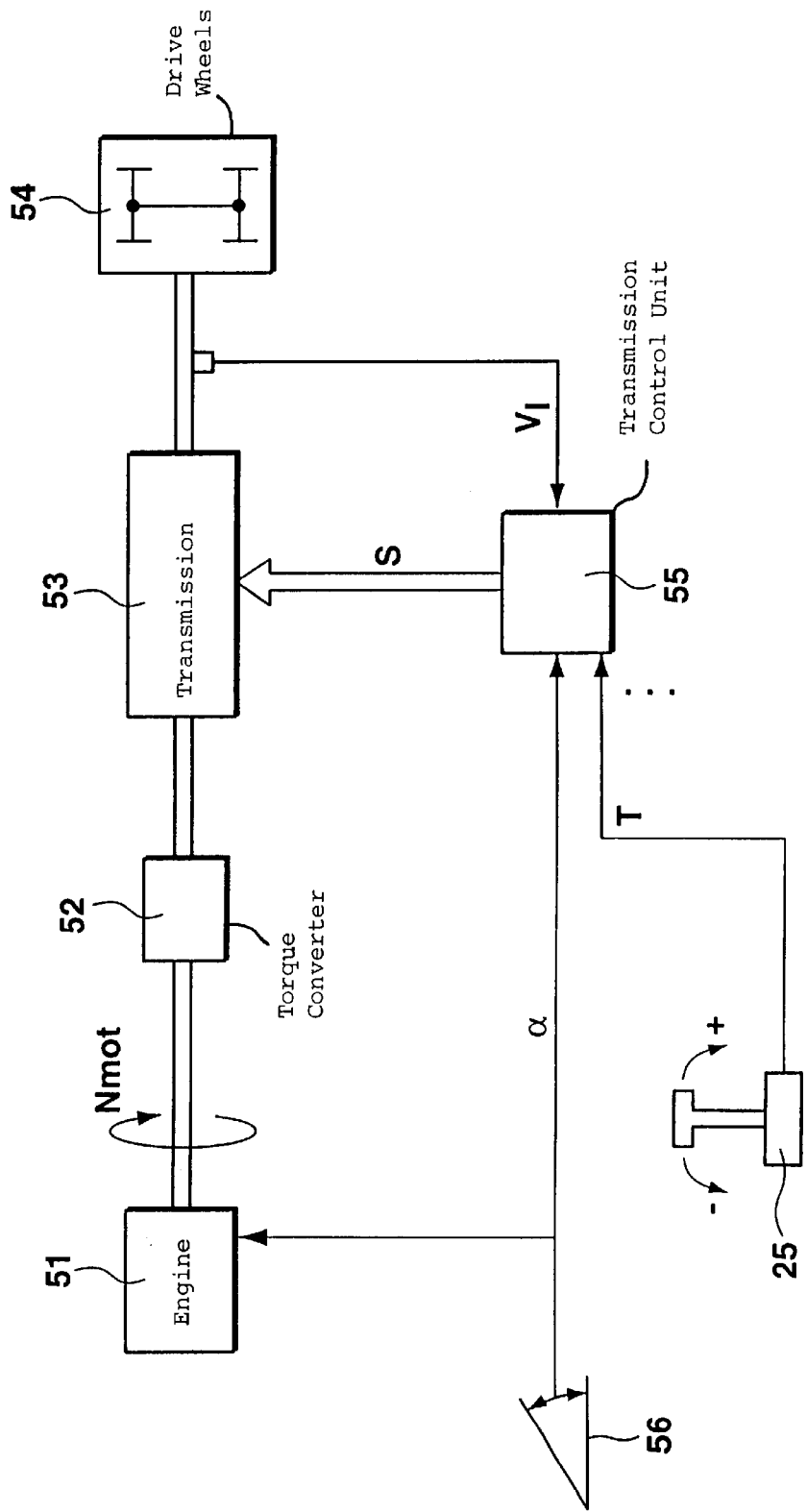
FIG. 1 is a schematic showing the drive train of a motor vehicle in the context of a block circuit diagram.

FIG. 1 schematically shows the drive train of a motor vehicle. The vehicle engine 51 having the engine rpm Nmot is connected via a clutch or a torque converter 52 and via the transmission 53 to the drive wheels 54 of the vehicle. The driver of the vehicle actuates the accelerator pedal 56 and sets an accelerator pedal angle α. The power and/or the torque of the vehicle engine 51 is controlled by the position α of the accelerator pedal 56.

The driver can initiate an upshift or downshift by actuating the selection lever or the selection switch 25.

The following are supplied to the transmission control unit 55: the position α of the accelerator pedal 56, the pulses T, which occur with the actuation of the selection lever or selection switch 25, as well as additional signals. As additional signals, the following are exemplary: the signals of a transverse acceleration sensor, of the wheel rpm sensors, of a temperature sensor and/or signals from the engine control. The transmission control unit 55 then determines a transmission gear essentially in dependence upon the input signals. The transmission gear is set by means of the signal S at the transmission 53.

Figure 2:
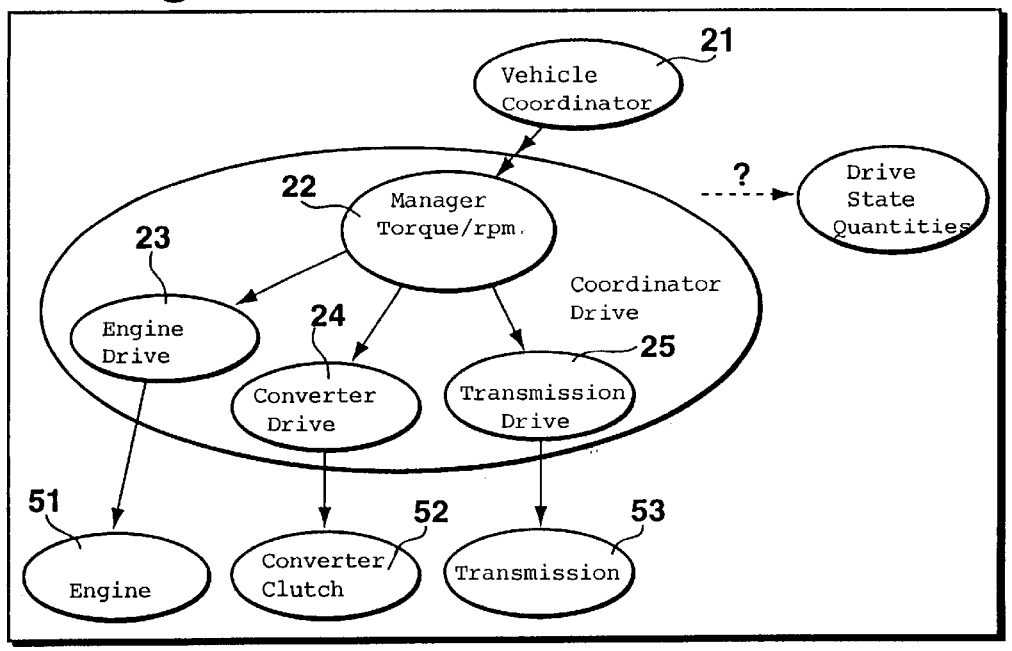
FIG. 2 is a schematic showing structures for controlling the function of the individual elements of the drive train.

FIGS. 2 and 3 show the hierarchically ordered structures for controlling the functions of the individual elements of the drive train.

In FIG. 2, the program block "vehicle coordinator" 21 indicates a command drive power or a command drive torque at the vehicle wheels, as a rule, primarily in dependence upon the driver command. The manager "torque/rpm" 22 converts this command into specific components which are converted via corresponding drivers 23, 24 and 25 by the engine 51, the torque converter 52 and/or the transmission 53. Reference can, for example, be made to U.S. Pat. No. 5,351,776 incorporated herein by reference. The invention relates to a part of the transmission driver 25.

In the structure shown in FIG. 3, the actual selection of the transmission gear to be set takes place in the gear selector 20'. This gear information is then supplied to the transmission 53 (FIG. 1) as actuating signal S. The data for determining the transmission gear to be engaged are supplied by individual components to the gear selector 20'. This can, for example, take place via specific inquiry commands on the part of the gear selector 20'. As components, the following blocks are presented in FIG. 3 as exemplary:

In block "vehicle quantities" 23', data specific to the vehicle are stored.

The position of the accelerator pedal, which is actuated by the driver, can be called up by block "accelerator pedal" 24'.

The driver can input upshift commands or downshift commands directly from the block "transmission operator field" 25'. In addition to the touch-shift selection switch, the driver can, in the automatic mode, for example limit the transmission gear stages or call up different shift programs (for example: P, 1, 2, 3, N, D, winter operation, economy/sport operation mode).

The gear selector is supplied by the block "engine" 26' with engine data such as engine rpm, engine load, and/or engine temperature.

Data of the instantaneously present dynamic driving behavior is present in the block "dynamic driving control" 27'.

The display within the field of view of the driver is identified by reference numeral 28'.

A quantity is determined in block "driver type" 22' which provides information as to the behavior of the driver. Here, it is generally evaluated whether the driver tends more to a driving-power orientated way of driving or tends more to a consumption-optimized way of driving.

The arrows shown in FIG. 3 between the gear selector 20' and the blocks 21' to 28' show specific inquiry commands from the gear selector 20'. In response to corresponding commands, the blocks then transmit the wanted data to the gear selector 20'. The communication between the gear selector 20' and individual blocks can, however, also take place in that the corresponding signals are continuously directed to the gear selector, that is, without specific inquiry commands from the gear selector 20'.

Figure 4:
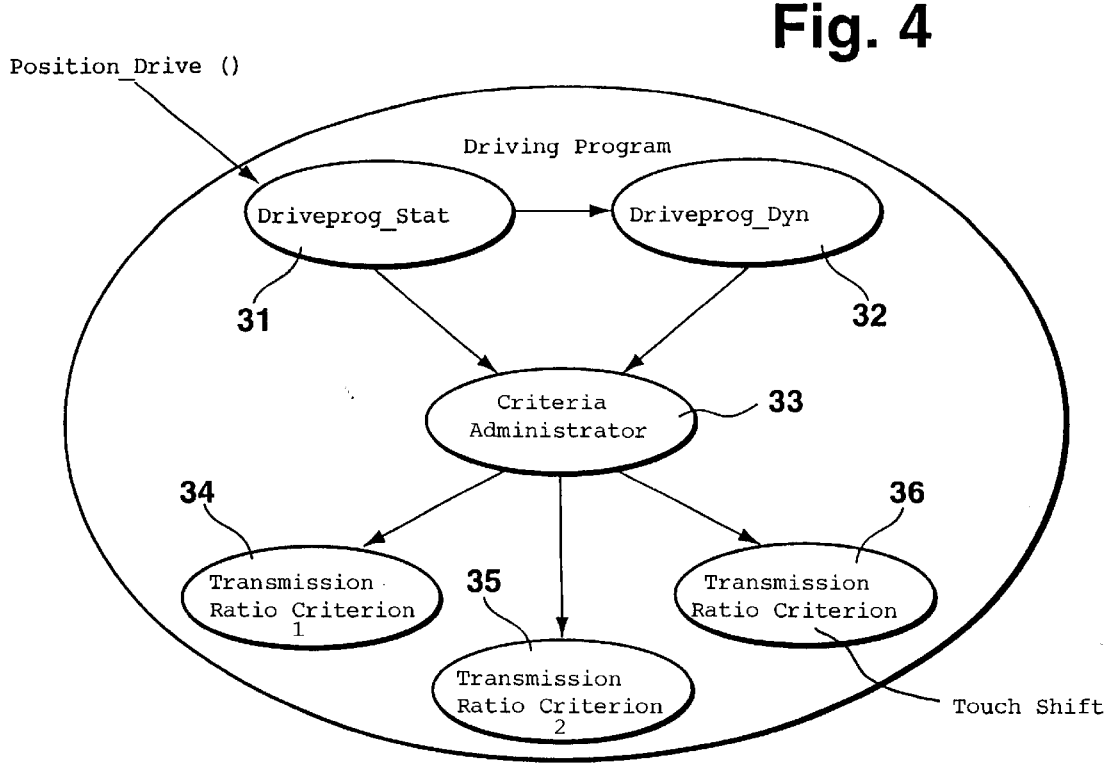
FIG. 4 shows the object "driving program"

FIG. 4 shows the object "driving program", which is a part of the object "transmission driver" 25 of FIG. 2, with its component object structure and communications structure. In transmission driver 25, the selection of the suitable transmission ratio or the suitable transmission gear takes place in the object "driving program" which is requested to select a transmission gear from the outside by the method "position_drive( )".

The task of the selection of a transmission gear is taken care of by the driving program via its component objects "driveprog_Stat" 31, "driveprog_Dyn" 32 and criteria administrator 33 which each occur precisely once as well as via a desired number of "transmission ratio criteria" 34, 35 and 36.

The transmission ratio criterion 36 is the transmission ratio criterion "touch-shift" (UKTIP) which is described in the following in greater detail.

Figure 5:
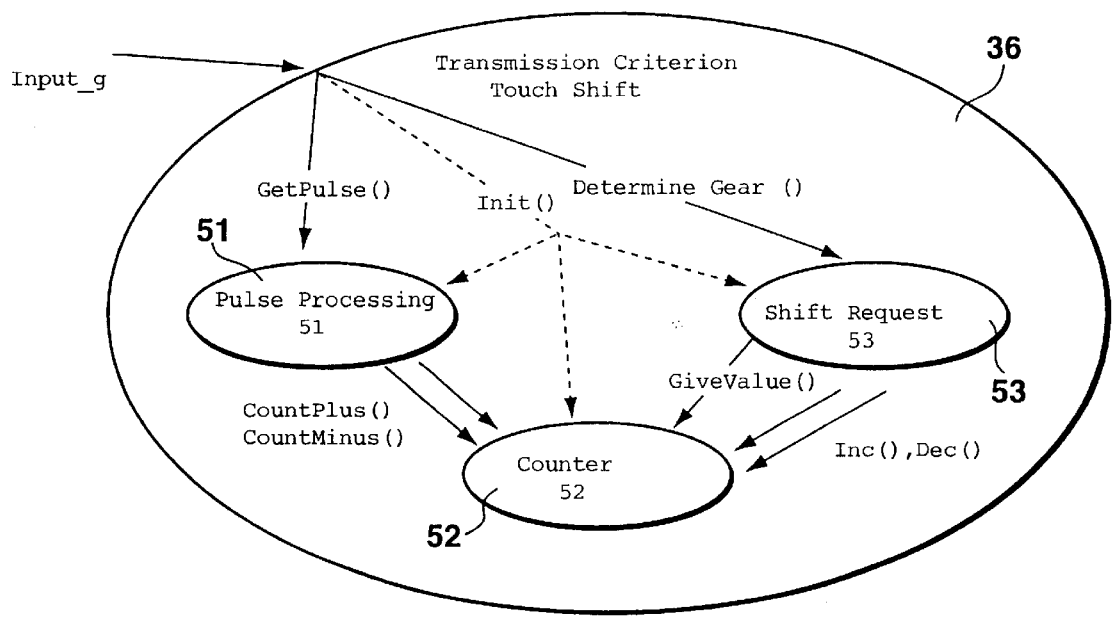
FIGS. 5, 6 and 7 show the function of the transmission ratio criterion "touch-shift" in detail.

The touch-shift function is illustrated via the transmission ratio criterion "touch-shift" (UKTIP) 36. As shown in FIG. 5, the transmission criterion divides into the component objects: pulse processing (TIPIM 51), counter (TIPZA 52) and shift request (TIPAN 53). The pulse processing 51 evaluates the input T of the driver and transmits valid transmission-ratio commands of the driver to the counter 52. The shift request 53 checks as to whether shift commands of the driver are stored in the counter 52 and executes these while considering peripheral conditions and safety criteria.

The transmission ratio criterion "touch-shift" 36 coordinates the tasks of its component objects. The structure can be seen in FIG. 5.

The transmission ratio criterion "touch-shift" 36 becomes active when the driver makes appropriate preparations at the transmission operator field 25'. Otherwise, the transmission operator field 25' remains inactive and returns "NONE" as gear request to the drive program.

The evaluation of the activities of the driver, which permit a conclusion to be drawn that the shift should be manual, is the task of the transmission operator field 25' and, with the transition into this state, the pulse processing 51, the counter 52 and the shift request 53 are initialized anew.

The possibility is present that the transmission ratio criterion "touch-shift" 36 is interrupted even when the driver wants to continue to shift manually (for example, via a higher prioritized transmission ratio criterion). For this reason, UKTIP 36 checks in each cycle as to whether the gear selection of the last cycle was made by UKTIP 36 itself. If this is not the case (UKTIP 36 has been interrupted), then, in turn, all component objects 51, 52 and 53 are newly initialized in order to return to a defined state and to prevent illogical or unwanted shifts.

After the initialization, and for each call-up of UKTIP 36, the pulse processing 51, which changes the counter 52 in correspondence to the actions of the driver, and subsequently the shift request 53 is called up. The shift request 53 reads out the counter 52 and returns a corresponding gear request until the selection lever 25 is again removed from the M path (manual mode).

1. Pulse Processing 51 (FIG. 6):

The pulse processing is implemented here in a simple form as state automatic with the three states:

"Start" 61;

"Do not wait +" 62; and,

"Do not wait –" 63 and starts with the start of the program and begins in the state "start" 61 after call-up of the initialization method by UKTIP 36.

In the state "start" 61, time elapses until the driver tips (touch-shift) the selection lever 25 "Plus" (or "minus"). Thereafter, there is a jump into the state "do not wait +" 62 or "do not wait –" 63 (commands "+" and "–" in FIG. 6).

Figure 6:
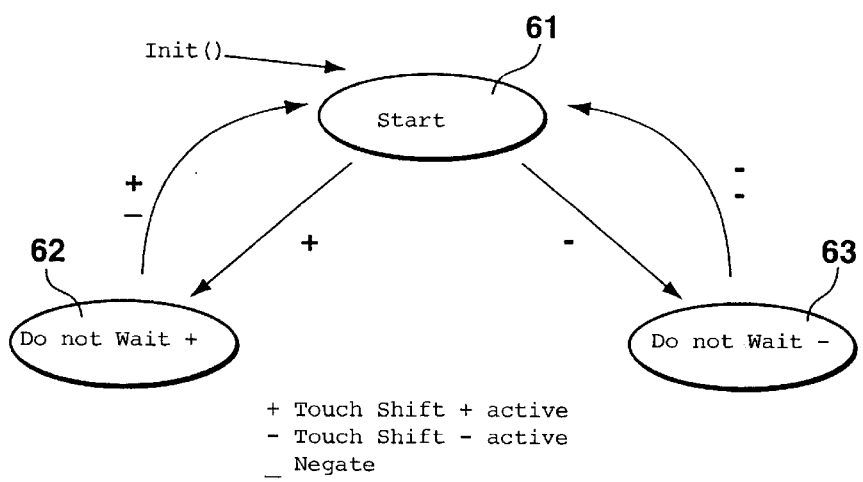

With the state change, the touch-shift counter 52 is incremented (or decremented) (commands "±" and "–" in FIG. 6). In the state "do not wait +" 62 or "do not wait –" 63, time elapses until the selection lever 25 is again in the neutral position between "plus" and "minus". This means that neither "plus" nor "minus" is touch-shifted. Now there is a jump back into the start state 61.

2. Counter 52:

The counter TIPZA_COUNTER 52 functions as interface between the pulse processing 51 and the shift request 53. It makes available the following methods:

"CountPlus ( )": The counter 52 is increased by one. The method is used by the pulse processing 51 in order to inform as to valid touch-shift pulses.

"CountMinus ( )": The counter 52 is reduced by one. The method is used by the pulse processing 51 to advise as to valid t ouch-shift pulses.

"Init( )": The counter 52 is set to zero. The method is used by the transmission ratio criterion TIP 36 to initialize the counter 52 at touch-shift start.

"GiveValue ( )": The actual counter value is given back. The method is used by the shift request 53 in order to execute the touch-shift requests of the driver.

"Inc( )": The counter 52 is increased by one. The method is used by the shift request 53 in order to erase read-out an d converted downshift requests thereafter from the counter 52.

"Dec( )": The counter is reduced by one. The method is used by the shift request 53 in order to erase read-out and converted upshift requests subsequently from the counter 52.

"Set(value)": The counter 52 is set to t he transferred value. The method is used by the shift request 53 in order to erase touch-shift requests from the counter 52 when a shift has been requested on the basis of the limit characteristic line (see description with respect to shift request).

3. Shift Request 53:

The shift request 53 sets its internal gear with the initialization to the actual target gear. Thereafter, the following three subprograms are called up:

Touch-shift characteristic line;

Touch-shift lever; and,

Touch-shift prevention.

(3a) Touch-Shift Characteristic Line: In subprogram "touch-shift characteristic line", the gear is first determined in accordance with a specific limiting characteristic line which, for example, is intended to prevent the engine from running at an rpm too high or at an rpm too low.

A transmission shift is required when the gear of the limiting characteristic line differs from the actual target gear of the transmission or when the driver actuates the kickdown switch (in general, by depressing the accelerator pedal). This panic function ensures that, for a command of the driver for maximum acceleration, the gear necessary therefor will be used without corresponding touch-shift commands.

Figure 7:
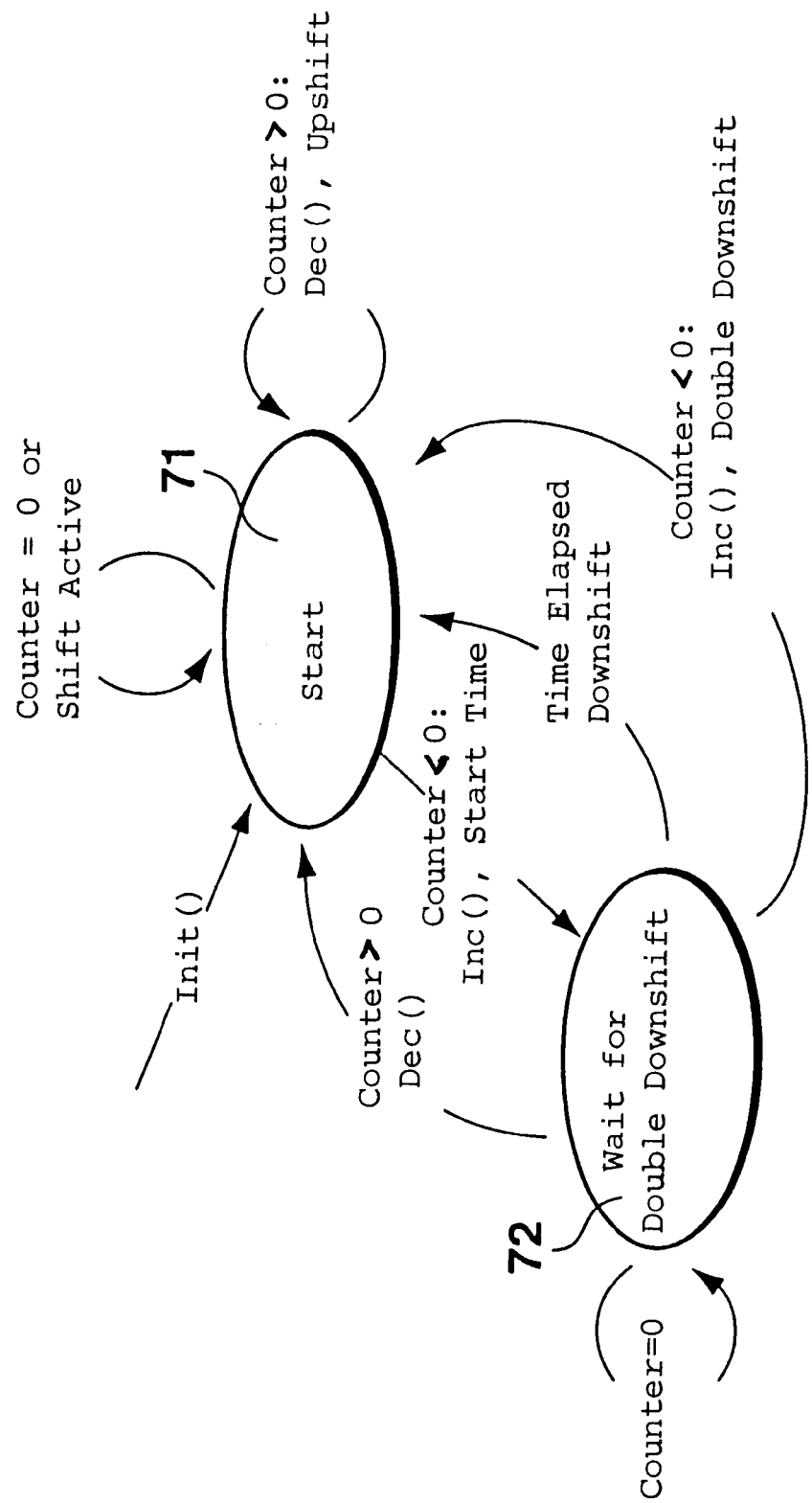

(3b) Function of the Touch-Shift Lever (FIG. 7):

The subprogram "touch-shift lever" is implemented with the two states "start" 71 and "wait for a double downshift" 72. After the program start and initialization by the transmission ratio criterion "touch-shift" 36, the subprogram is in the state "start" 71.

In the state "start" 71, when no shifting is active, the counter 52 is read out. When an upshift is requested (counter value >0), the counter 52 is decremented and the upshift request is transmitted to the subprogram "touch-shift prevention" as explained hereinafter. When a downshift (counter value <0) is requested, the counter 52 is incremented and a jump into the state "wait for double downshift" 72 takes place. Additionally, a double downshift waiting time is started. When no request is present in the counter 52, time elapses in the start state.

In the state "wait for a double downshift" 72, the counter 52 is read out as long as the double downshift wait time has not yet elapsed. If an upshift is requested during this time, then the counter 52 is incremented and no shift is requested. The automat then jumps back into the start state.

If, however, a further downshift is requested, then the counter 52 is incremented, a double downshift is requested and the counter jumps back into the start state. If the double downshift wait time runs without the occurrence of a further touch-shift command, then a simple downshift is requested and there is a jump back into the start state.

(3c) Function of the Touch-Shift Prevention:

In the subprogram "touch-shift prevention", a check is made as to whether a manual shift into the desired gear would lead to an impermissible rpm (overrunning or stalling of the engine). This is done in order to prevent such a shifting. Case of Double Downshifting:

If the requested double downshifting would lead to an engine rpm which is too high, then the double downshifting is converted into a single downshifting. Thereafter, the subprogram for the downshifting is run through. Case of Downshifting:

If the requested downshift would lead to an engine rpm which is too high, then no shifting is requested. Case of Upshifting:

If the requested upshifting would lead to an engine rpm which is too low, then no shifting is requested. Summary:

The invention affords the advantage that the pulse determination 51 and the conversion of the pulses (shift request 53) into specific inputs for the transmission are realized in the software completely independently of each other.

The pulse determination 51 and the shift request 53 communicate only indirectly with each other via the object "counter" 52. In each of the three components, customer-specific changes can be undertaken independent of each other. The pulse determination 51 and the shift request 53 can even be processed in different time rasters in order to accommodate each time-dependent request. With the defined interfaces of the objects, the exchangeability thereof is made possible whereby especially a software reuse is facilitated.

It is understood that the foregoing description is that of the preferred embodiments of the invention and that various changes and modifications may be made thereto without departing from the spirit and scope of the invention as defined in the appended claims.

What is claimed is:

1. A system for adjusting a transmission ratio in a transmission built into a motor vehicle, the system comprising:

selection means actuable by a driver of the vehicle with which the driver can output pulses (T) for changing the transmission ratio;

a first component object (pulse processing) for detecting said pulses (T);

a second component object (counter) for determining and storing count values in dependence upon valid pulses;

a third component object (shift request) for determining shift requests in dependence upon said count values and while considering pregiven peripheral conditions; and, means for setting the transmission ratio in dependence upon the shift requests.

2. The system of claim 1, wherein said selection means is so configured that the driver can input either an upshift command or a downshift command.

3. The system of claim 1, wherein said first component object (pulse processing) can detect the pulses (T) in such a manner that a single pulse is detected per actuation of the selection means.

4. The system of claim 1, wherein said second component object (counter) is configured as a counter and increases a count value or decreases a count value in dependence upon a pulse detected by said first component object (pulse processing).

5. The system of claim 1, wherein said third component object (shift request) has a first part (touch-shift prevention) with which a check is made as to whether a transmission gear, which is wanted via actuating said selection means, is permissible or impermissible; and, wherein such transmission shift operations are prevented which would lead to an impermissibly high or impermissibly low rpm of the engine of said motor vehicle.

6. The system of claim 1, wherein said third component object (shift request) has a second part (touch-shift lever) by means of which, in the case of a downshift operation wanted because of an actuation of said selection means, a predeterminable time duration elapses until a downshift operation is initiated; and, during this time span, the count value is read out from said second component object (counter).

7. The system of claim 1, wherein said third component object (shift request) includes a third part (touch-shift characteristic line) by means of which a determination is made as to whether the instantaneously adjusted transmission gear is within a pregiven range; and, wherein a shift operation is then initiated when the instantaneously adjusted transmission gear is disposed outside of said range.

8. The system of claim 1, wherein said third component object (shift request) has a third part (touch-shift characteristic line) by means of which a downshift operation is triggered in dependence upon the actuation of a kick-down switch.

* * * * *